United States Patent
Cipollone et al.

(10) Patent No.: US 11,449,205 B2
(45) Date of Patent: Sep. 20, 2022

(54) STATUS-BASED READING AND AUTHORING ASSISTANCE

(71) Applicant: Microsoft Technology Licensing, LLC, Redmond, WA (US)

(72) Inventors: Domenic Joseph Cipollone, Montgomery, OH (US); Susan Hendrich, Redmond, WA (US); Kaushik Ramaiah Narayanan, Bellevue, WA (US); Kevin Field, Seattle, WA (US); Alfredo R. Arnaiz, Bellevue, WA (US); Kyle Matthew Von Haden, Carrickmines (IE); Kevin Roland Powell, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/371,741

(22) Filed: Apr. 1, 2019

(65) Prior Publication Data
US 2020/0310607 A1 Oct. 1, 2020

(51) Int. Cl.
*G06F 3/0484* (2022.01)
*H04L 67/50* (2022.01)

(52) U.S. Cl.
CPC .......... *G06F 3/0484* (2013.01); *H04L 67/535* (2022.05)

(58) Field of Classification Search
CPC ...... G06F 3/0484; H04L 67/22; H04L 67/535
See application file for complete search history.

(56) References Cited

U.S. PATENT DOCUMENTS 6,775,805 B1 * 8/2004 Watanabe ........... G06F 16/9577
715/202
7,076,730 B1 * 7/2006 Baker ....................... G06F 9/44
709/206

(Continued)

FOREIGN PATENT DOCUMENTS

CN 107861672 A 3/2018
WO 2017136440 A1 8/2017

OTHER PUBLICATIONS

Andy Wolber, "4 text-to-speech apps that will read online articles to you," Jul. 5, 2017, https://www.techrepublic.com/article/4-text-to-speech-apps-that-will-read-online-articles-to-you/, 11 pages (Year: 2017).*

(Continued)

*Primary Examiner* — Tadesse Hailu
(74) *Attorney, Agent, or Firm* — Talem IP Law, LLP

(57) ABSTRACT

Status-based reading and authoring assistance is provided. A status-based reading and authoring assistance feature can automatically determine a status of a user and automatically adapt reading and authoring tools provided for display based on the determined status. The status-based reading and authoring assistance feature provides the right reading and authoring tools at the right time, according to the current use of the application. During a user session with respect to a productivity application that includes status-based reading and authoring assistance, signals (e.g., user actions and context information) associated with a file can be received. A status regarding the use of the file can be determined using at least the signals. The status can comprise a reading status or an authoring status (or even a sub status). Reading and authoring tools provided for a display of the productivity application can be adapted based on the status during the user session.

19 Claims, 11 Drawing Sheets

(56) References Cited

U.S. PATENT DOCUMENTS

| | | | | |
|---|---|---|---|---|
| 7,444,374 B1* | 10/2008 | Baker | | G06F 9/44 709/206 |
| 7,661,065 B2* | 2/2010 | Nickolov | | G06Q 10/10 715/273 |
| 8,302,020 B2* | 10/2012 | Louch | | B60K 35/00 715/764 |
| 8,387,006 B1* | 2/2013 | Taylor | | G06F 16/958 717/110 |
| 9,002,700 B2 | 4/2015 | Hoover et al. | | |
| 9,275,017 B2* | 3/2016 | Tigchelaar | | G06F 40/103 |
| 2006/0132821 A1* | 6/2006 | Nonaka | | H04N 1/00127 358/1.13 |
| 2006/0190804 A1* | 8/2006 | Yang | | G06F 40/186 715/236 |
| 2006/0282784 A1* | 12/2006 | Taylor | | G06Q 10/10 715/751 |
| 2007/0185909 A1* | 8/2007 | Klein | | G11B 27/34 |
| 2008/0140652 A1* | 6/2008 | Millman | | G09B 17/00 |
| 2008/0177793 A1* | 7/2008 | Epstein | | G01C 21/32 |
| 2010/0005169 A1* | 1/2010 | Von Hilgers | | G06Q 10/00 709/224 |
| 2012/0033948 A1* | 2/2012 | Rodriguez | | G11B 27/34 386/282 |
| 2012/0159318 A1* | 6/2012 | Shaw | | G06F 40/166 715/273 |
| 2013/0073964 A1* | 3/2013 | Meaney | | G11B 27/34 715/716 |
| 2014/0026055 A1* | 1/2014 | Cohn | | G06F 3/04883 715/727 |
| 2014/0258933 A1* | 9/2014 | Dukhon | | G06F 3/0482 715/825 |
| 2014/0358519 A1* | 12/2014 | Mirkin | | G06F 40/51 704/3 |
| 2015/0006258 A1* | 1/2015 | Salama | | G06Q 30/0282 705/7.35 |
| 2016/0133150 A1* | 5/2016 | Sutz | | G09B 17/04 434/178 |
| 2016/0275091 A1* | 9/2016 | Saqer | | G06F 16/958 |
| 2016/0364090 A1* | 12/2016 | Douglas | | G06F 3/0482 |
| 2017/0156589 A1* | 6/2017 | Wu | | G02B 27/017 |
| 2017/0220535 A1* | 8/2017 | Olsen | | G06F 40/166 |
| 2017/0220536 A1* | 8/2017 | Chiba | | G06F 40/109 |
| 2017/0323205 A1* | 11/2017 | Gonzalez | | G06F 40/253 |
| 2017/0351664 A1* | 12/2017 | Hahn | | G06F 40/289 |
| 2018/0083908 A1* | 3/2018 | Dotan-Cohen | | H04L 51/24 |
| 2019/0188463 A1* | 6/2019 | Sodhani | | G06N 3/084 |
| 2019/0196675 A1* | 6/2019 | German | | G09B 5/06 |
| 2019/0332168 A1* | 10/2019 | Weldemariam | | A61B 5/6821 |
| 2019/0364118 A1* | 11/2019 | Camera | | G06F 40/10 |

OTHER PUBLICATIONS

Karre, Tony, "How Microsoft Word "Protected View" Stops Information Leaks", Retrieved From: https://blogs.perficient.com/2018/05/22/how-microsoft-word-protected-view-stops-information-leaks/, Dated May 22, 2018, 27 Pages.

"International Search Report & Written Opinion issued in PCT Application No. PCT/US2020/024346", dated Jul. 9, 2020, 14 Pages.

Sartain, JD, "Microsoft Word Reads to You: How to Use the Speak and Read Aloud Commands", Retrieved From: https://www.pcworld.com/article/3335677/microsoft-word-reads-to-you-how-to-use-the-speak-and-read-aloud-commands.html, Jul. 2, 2020, 6 Pages.

Walter, Derek, "Office 2016's Smart Lookup is the Next-Best thing to a Personal Research Assistant", Retrieved From: https://www.pcworld.com/article/3018186/office-2016s-smart-lookup-is-the-next-best-thing-to-a-personal-research-assistant.html. Dated Feb. 16, 2016, 7 Pages.

* cited by examiner

FIG. 6B

STATUS-BASED READING AND AUTHORING ASSISTANCE

BACKGROUND

Productivity applications include reading and authoring tools for creating, editing, and consuming (e.g., by viewing or listening) documents, presentations, spreadsheets, databases, charts and graphs, images, video, audio, and the like. These applications can be in the form of a word processing software, spreadsheet software, personal information management (PIM) and email communication software, presentation programs, note taking/storytelling software, diagram and flowcharting software, document viewing software, web browser software, and the like. Examples of productivity applications include the MICROSOFT OFFICE suite of applications from Microsoft Corp., such as MICROSOFT WORD, MICROSOFT EXCEL, MICROSOFT ONENOTE, all registered trademarks of Microsoft Corp.

Within productivity applications, a command generally refers to a directive to perform a specific action related to a feature available in the productivity application, and is applied by a user clicking on an icon or character representing the particular feature or by performing some other action (via touch or voice) to select the command. Examples of commands within a productivity application include, but are not limited to, save, open, copy, cut, paste, select all, undo, redo, underline, highlight, increase/decrease font size, fill, insert, scroll, search, and print. People use these productivity applications to create, modify, and consume content.

BRIEF SUMMARY

Status-based reading and authoring assistance is provided. According to certain examples, a status-based reading and authoring assistance feature can automatically determine a status of a user and automatically adapt reading and authoring tools provided for display based on the determined status. Advantageously, the status-based reading and authoring assistance feature provides the right reading and authoring tools at the right time, according to the current use of the application. Indeed, the status-based reading and authoring assistance feature not only provides appropriate assistance to a user but can also start offering the appropriate assistance at the right time.

During a user session with respect to a productivity application that includes status-based reading and authoring assistance, signals associated with a file can be received. The signals can include one or more user actions and context information. A status regarding the use of the file can be determined using at least the signals. The status can comprise a reading status or an authoring status (or even a sub status). Reading and authoring tools provided for a display of the productivity application can be adapted based on the status during the user session.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4A illustrates a process flow for generating models and FIG. 4B illustrates a process flow for operation.

FIGS. 6A-6C illustrate an example scenario for an application with a status-based reading and authoring assistance feature according to an example embodiment of the invention.

DETAILED DESCRIPTION

Figure 1A:
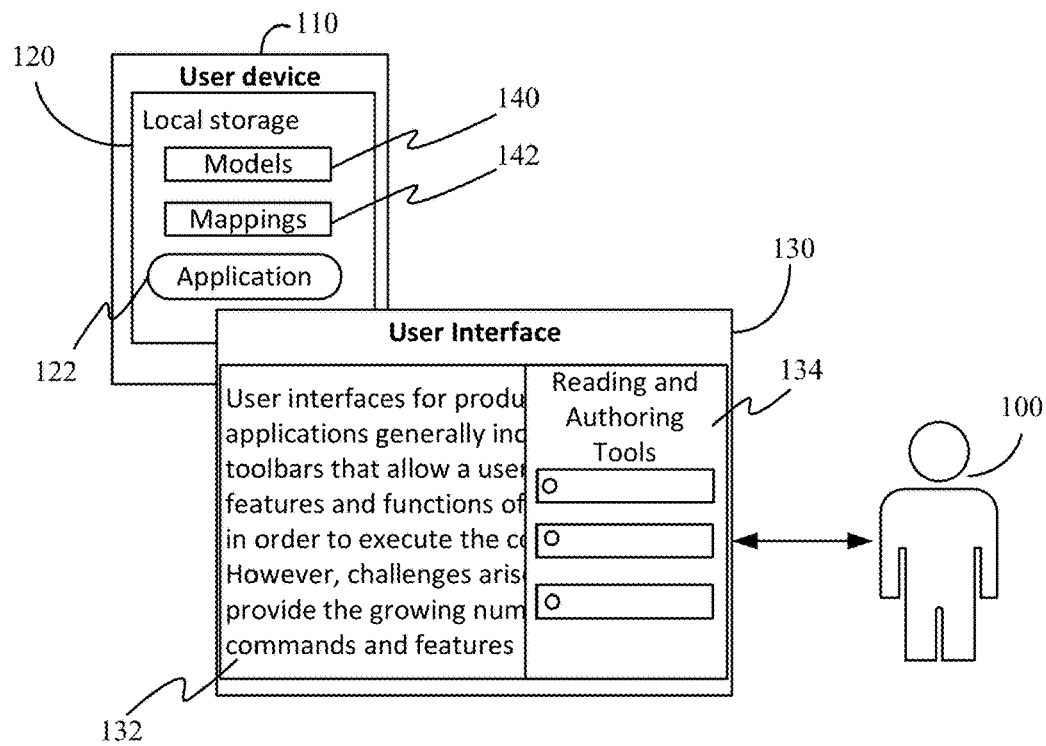
FIGS. 1A and 1B illustrate example operating environments for status-based reading and authoring assistance.

Status-based reading and authoring assistance is provided.

Productivity applications provide significant capabilities at a person's fingertips to create, modify, and consume content. As these programs expand to include more features and functions, the number of available commands that a user can perform increases.

User interfaces for productivity applications generally include menus and toolbars that allow a user to access features and functions of the application in order to execute the commands. However, challenges arise regarding how to provide the growing number of commands and features to a user without taking over the user interface or inhibiting the user from accomplishing their primary task.

According to certain examples, the described status-based reading and authoring assistance feature can, throughout a user session of an application, automatically determine a status of a user and automatically adapt reading and authoring tools provided for display based on the determined status. Advantageously, the status-based reading and authoring assistance feature provides the right reading and authoring tools at the right time, according to the current use of the application. Indeed, the status-based reading and authoring assistance feature not only provides appropriate assistance to a user but can also start offering the appropriate assistance at the right time.

During a user session with respect to a productivity application that includes status-based reading and authoring assistance, signals associated with a file can be received. The signals can include one or more user actions and context information. A status regarding the use of the file can be determined using at least the signals. The status can comprise a reading status or an authoring status (or even a sub status). Reading and authoring tools provided for a display of the productivity application can be adapted based on the status during the user session.

A "status" refers to an activity indication regarding the use of a file during a particular session for an interval of time. Examples of a status include, but are not limited to, a reading status and an authoring status. A reading status and an authoring status may be broken down into more granular sub statuses. In some cases, a reading status may include a skimming sub status, a scanning sub status, a deep reading sub status, and an offline reading sub status. In some cases, an authoring status may include a deep writing sub status, a shallow writing sub status, an editing sub status, and a reviewing sub status.

Through the integration of the described feature with various productivity applications, interruptions to a user's productivity (e.g., spelling and grammar marks within the authoring canvas) can be controlled by automatically detecting the use of a file and adapting reading and authoring assistance based on the status of a user.

As an illustrative example, if a user's primary task is a deep writing scenario (e.g., sitting down and putting thoughts onto paper), the user may not want to be bothered (e.g., may not want to see any default grammar or spelling markings on the content they are authoring). Advantageously, the status-based reading and authoring assistance feature can automatically determine the user has a deep writing status and can adapt reading and authoring assistance based on the deep writing sub status. In this case, the user may not be provided with any reading and authoring assistance until the user's primary task changes. Thus, the user is not overwhelmed with a lot of tools and things to check. Then, when the user starts to edit the content, the status-based reading and authoring assistance feature can automatically determine that the user now has an edit sub status and adapt the reading and authoring tools to provide the appropriate assistance.

The reading and authoring tools dynamically surfaced onto the user interface of the productivity application are tools that exist in the productivity application. Instead of simply presenting tools commonly used by most users in general or even customized to a specific user's general activity at the launch of the program, reading and authoring tools can be adapted at any time throughout and during use of the program based on a determination of the status of the user. Indeed, the reading and authoring tools can be specific to the user's current status and can change as needed throughout a session. Any number of reading and authoring tools—including notifications—may be surfaced on the user interface either within the authoring canvas (e.g., on content) or in a panel or menu.

Figure 1B:
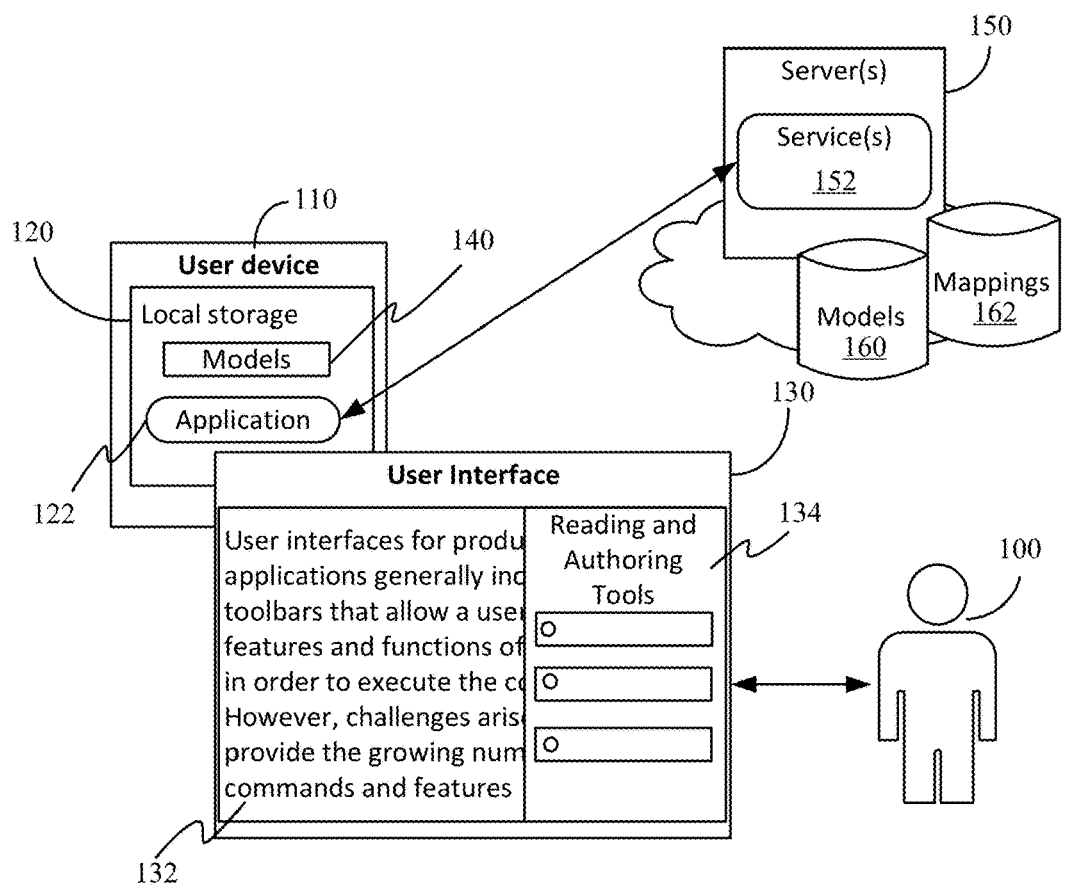

FIGS. 1A and 1B illustrate example operating environments for status-based reading and authoring assistance. FIG. 1A illustrates an offline implementation; and FIG. 1B illustrates an online implementation. Referring to both FIGS. 1A and 1B, a user 100 may be interacting with a computing device 110 when reading or authoring content that may be suitable for status-based reading and authoring assistance. The computing device 110 includes, among other components, a local storage 120 on which an application 122 may be stored. The application 122 may be an application with a status-based reading and authoring assistance feature or may be a web browser or front-end application that accesses the application with the status-based reading and authoring assistance feature over the Internet or other network. Application 122 includes a graphical user interface 130 that can provide a canvas 132 in which content may be created or consumed and a pane or window 134 (or contextual menu or other suitable interface) providing reading and authoring tools. Application 122 may be any suitable productivity application.

In the offline scenario shown in FIG. 1A, user 100 may interact with a file displayed in the user interface 130. The status-based reading and authoring assistance feature (e.g., as part of application 122) can use a set of models 140 stored in the local storage 120 to determine a status. The models 140 may be provided as part of the status-based reading and authoring assistance feature and, depending on the robustness of the computing device 110 may be a 'lighter' version (e.g., may have fewer feature sets) than models available at a server.

The status-based reading and authoring assistance feature can then adapt reading and authoring tools provided for display based on the determined status. In some cases, the status-based reading and authoring assistance feature may use mappings 142 stored in the local storage 120 to determine the one or more of the reading and authoring tools that correspond to the determined status. The mappings can include structured information mapping statuses to particular reading and authoring tools.

In the online scenario shown in FIG. 1B, user 100 may interact with a file displayed in the user interface 130. The status-based reading and authoring assistance feature (e.g., as part of application 122) can communicate with a server 150 providing status-based reading and authoring assistance services 152 that use one or more models 160 to determine a status.

In some cases, the status-based reading and authoring assistance services 152 can use a status data resource 162 and the determined status to adapt reading and authoring tools provided for display. The status data resource can include structured information mapping statuses to particular reading and authoring tools.

In some cases, the status-based reading and authoring assistance services 152 can communicate the determined status to the status-based reading and authoring assistance feature (e.g., as part of application 122) and the status-based reading and authoring assistance feature can then adapt reading and authoring tools provided for display based on the determined status.

Figure 2:
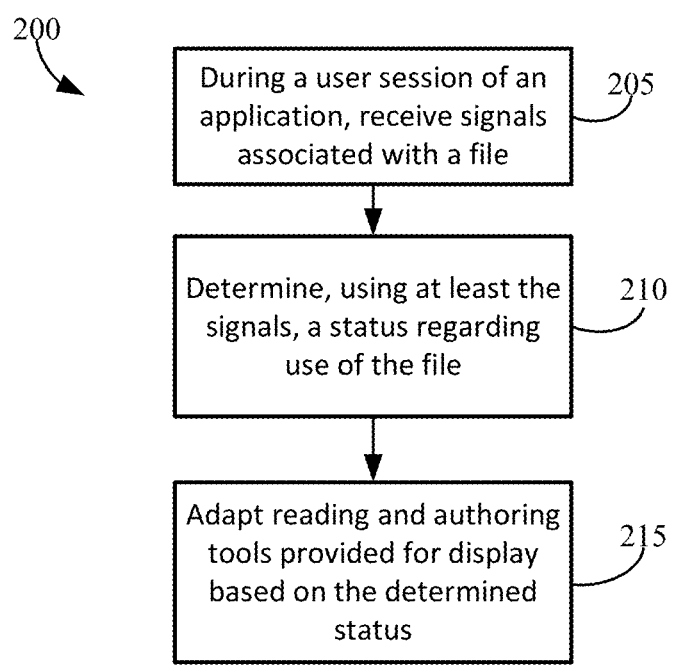
FIG. 2 illustrates an example process flow diagram for providing status-based reading and authoring assistance according to certain embodiments of the invention.

FIG. 2 illustrates an example process flow diagram for providing status-based reading and authoring assistance according to certain embodiments of the invention. Some or all of process 200 may be executed at, for example, server 150 as part of services 152 (e.g., server 150 may include instructions to perform process 200). In some cases, process 200 may be executed entirely at computing device 110, for example, as an offline version (e.g., computing device 110 may include instructions to perform process 200). In some cases, process 200 may be executed at computing device 110 while in communication with server 150 to support status determination (as discussed in more detail with respect to FIG. 3).

Referring to FIG. 2, during a user session of a productivity application, process 200 can include receiving (205) signals associated with a file. In some cases, the signals can be received in real time or near real time as the user executing commands within an application.

The signals associated with the file can comprise one or more user actions. The one or more user actions may include user command actions from a user's current active session. For example, when a user executes commands within an application (e.g., a command within a ribbon, menu, or toolbar), the commands may be provided to the service(s) as a stream of commands.

In some cases, the signals associated with the file can further include context information. The context information may include, but is not limited to, a user name (which may be used to obtain user history or user-specific information that can be used to determine a status), user history information (e.g., a past history of the user's interaction with each reading and authoring tool and similar documents), an application name (e.g., the application for which content is being created/consumed), an application state, application permissions (e.g., read only or read and write), a file name (e.g., the name of the file being created/consumed), a file type, file lifecycle information, content in the file, a client type, or a combination thereof.

The process can further include determining (210) a status regarding use of the file using at least the signals.

In some cases, machine learning is used to determine the status. In this case, the determining of the status can include analyzing the signals using a status engine such as described with respect to FIGS. 3, 4A, and 4B. The status engine can include one or more models to analyze the signals.

In some cases, the analysis of the signals can produce a confidence value, such as a number between 0 and 1, which can indicate how likely it is that the user belongs to a certain status.

In some cases, determining the status can be performed in real time or near real time. In some cases, an initial status may be determined when the user starts interacting with a file. For example, any commands executed in the first five seconds may be analyzed to determine an initial status. Then, as the user continues to execute commands and new signals are received, the status may be updated.

In some cases, the user's status may change multiple times during an active session as new signals are received. In an illustrative example, the user may start an active session by reading the entire file. In this case, the status of the user may be a read status or a deep read sub status. Then, the user may start adding content to the end of the file. In this case, the status of the user can update to an authoring status or a shallow writing sub status.

In another illustrative example, the user may start an active session by writing content in a file. In this case, the status of the user may be an authoring status or deep writing sub status. Then, the user may start editing the content they wrote. In this case, the status of the user can update to a different authoring status, such as an editing sub status.

Once the status is determined, the process further includes adapting (215) reading and authoring tools provided for display based on the determined status. Adapting the reading and authoring tools can include determining one or more of the reading and authoring tools that correspond to the determined status. The one or more of the reading and authoring tools can be provided for display.

As previously discussed, in some cases, a status data resource comprising structured information mapping statuses to particular reading and authoring tools can be used to determine the one or more of the reading and authoring tools that correspond to the determined status.

In an illustrative example, the reading and authoring tools corresponding to a read status may include, but are not limited to, a time to read tool, a read aloud tool, a language tool, a decoding acronyms tool, a key point tool, and a dictionary tool. In another illustrative example, the reading and authoring tools corresponding to a deep read sub status may include, but are not limited to, a time to read tool and a read aloud tool.

In an illustrative example, the reading and authoring tools corresponding to an authoring status may include, but are not limited to, a grammar tool, a spelling tool, a rewrite tool, a writing refinement tool, a dictionary tool, and a thesaurus tool. In yet another illustrative example, the reading and authoring tools corresponding to a deep read sub status may include, but are not limited to, a grammar tool, a spelling tool, a dictionary tool, and a thesaurus tool.

In some cases, a user with a deep read sub status may not want to be bothered while reading a file. In this case, the deep read sub status may include no reading and authoring tools. Similar to a deep read sub status, a user with a deep writing sub status may not want to be bothered while writing. In this case, no reading and authoring tools may correspond to the deep writing sub status. For example, the default grammar and spelling tools may be disabled or hidden.

The reading tools and authoring tools may be displayed to the user via a pane or window 134 as shown in FIGS. 1A and 1B. In some cases, some default menus and toolbars may be hidden when the provided reading and authoring tools are displayed.

As previously described, the status may change as new signals are received. As the status changes because of the new signals received, the process further includes adapting the reading and the authoring tools provided for the display based on the determined status by updating the display with one or more of the reading and authoring tools corresponding to an updated status.

Figure 3:
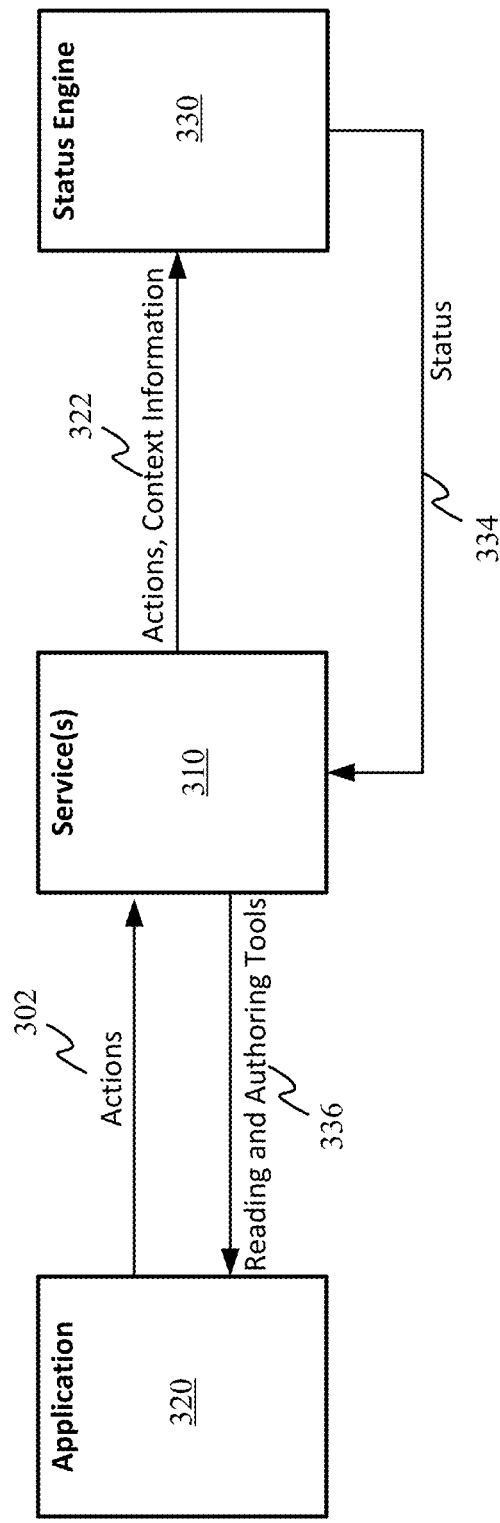
FIG. 3 illustrates an example implementation of status-based reading and authoring assistance according to an embodiment of the invention.

FIG. 3 illustrates an example implementation of status-based reading and authoring assistance according to an embodiment of the invention. Referring to FIG. 3, user actions 302 associated with a file can be received at status-based reading and authoring assistance services 310. The user actions 302 can be captured by an application 320, such as application 122 as described with respect to FIGS. 1A and 1B. Aspects of service(s) 310 may themselves be carried out on computing device 110 described with respect to FIGS. 1A and 1B and/or may be performed at a server such as server 150 described with respect to FIG. 1B.

The user actions 302 provided to/received by service(s) 310 may include user command actions from a user's current active session in the application 320. For example, when a user executes commands within the application 320 (e.g., a command within a ribbon, menu, or toolbar, or even a scrolling or typing action), the commands may be provided to the service(s) as a stream of commands.

In some cases, context information may be obtained by service(s) 310 from a variety of sources. For example, service(s) 310 may communicate with the device operating system to receive the context information. In another example, the context information may be communicated by the application 320, for example, with the user actions 302.

As previously described, the context information may include, but is not limited to, a user name, user history information, an application name, an application state, application permissions, a file name, a file type, file lifecycle information, content in the file, a client type, or a combination thereof.

The user actions and context information (322) may be communicated to a status engine 330, which may be a machine learning or other artificial intelligence engine, for determining a status.

The status engine 330 can determine a status of the user by analyzing the user actions and context information (322) using one or more models. Each of the one or more models can be any suitable machine learning or other artificial intelligence model and can employ, for example, aggregated data. The model(s) can be used to determine (e.g., predict) the most likely status based on a user's actions (and optionally context information).

As an illustrative example of analyzing user actions, if the user actions include a print command, a reading status may be the most appropriate status. As another illustrative example, if the user actions include copy and paste commands, an authoring status may be the most appropriate status. As yet another illustrative example, if the user actions include a save command, an authoring status may be the most appropriate status.

As an illustrative example of analyzing context information, if the application permission indicates a read-only mode, a reading status may be the most appropriate status. As another illustrative example, if the file lifecycle information indicates the file is a new file, an authoring status may be the most appropriate status. As yet another illustrative example, if the client type indicates a mobile device, a reading status may be the most appropriate status.

The result (e.g., determined status 334) of the analysis at the status engine 330 can be returned to the service(s) 310, which can adapt reading and writing tools provided for display based on the determined status 334. The service(s) 310 can determine one or more of the reading and authoring tools that corresponds to the determined status and provide the one or more of the reading and authoring tools 336 to the application 320 for display.

Figure 4A:
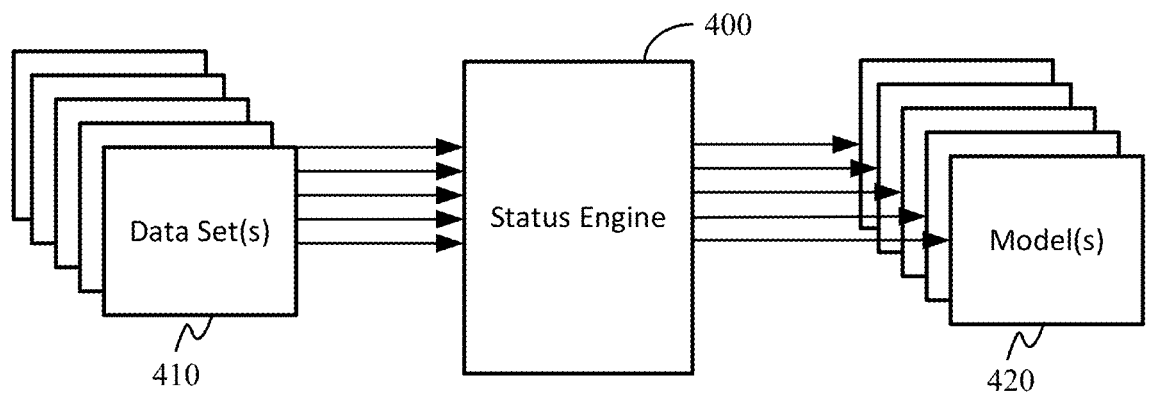
FIGS. 4A and 4B illustrate an example status engine, where
Figure 4B:
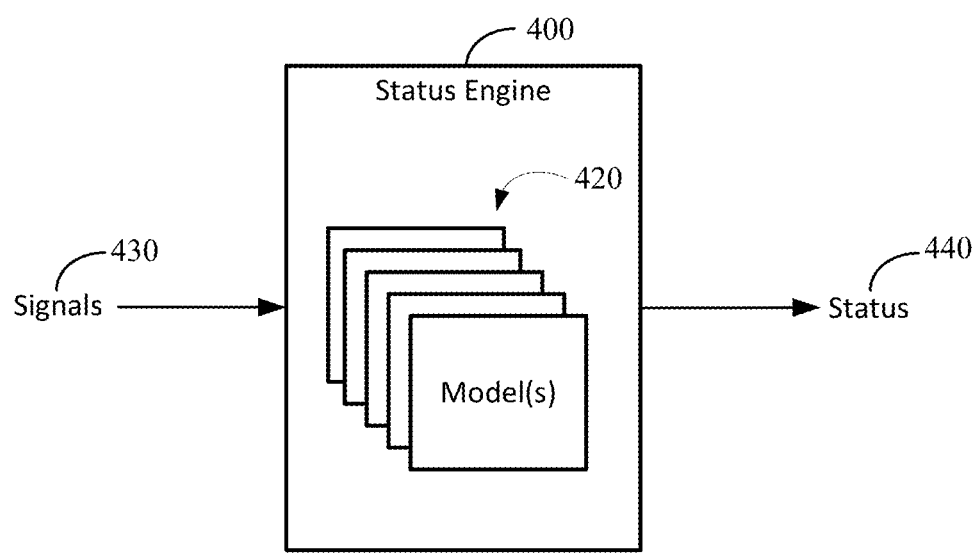

FIGS. 4A and 4B illustrate an example status engine, where FIG. 4A shows a process flow for generating models and FIG. 4B shows a process flow for operation. Turning first to FIG. 4A, a status engine 400 may be trained on various sets of data 410 to generate appropriate models 420.

The various sets of data 410 can include aggregated session data. Aggregated session data can include anonymized session data for a plurality of users. That is, with user permission, session data for each of a plurality of users may be anonymized and used to generate models 420. The session data (e.g., features) for each session can include, but is not limited to, user actions, session length, read action information (e.g., read action count), write action information (e.g., write action count), other action information, file extension, browser, document location (e.g., SharePoint or Box file storage location), and file size.

The status engine 400 may continuously receive additional sets of data 410, which may be processed to update the models 420. As previously described, in some cases, the models 420 can be stored locally, for example, as an offline version. In some of such cases, the models 420 may continue to be updated locally.

The models 420 may include such models generated using any suitable machine learning or other artificial intelligence process. It should be understood that the methods of performing the determination of a status include, but are not limited to, hierarchical and non-hierarchical Bayesian methods; supervised learning methods such as logistic regression, Support vector Machines, neural nets, bagged/boosted or randomized decision trees, and k-nearest neighbor; and unsupervised methods such as k-means clustering and agglomerative clustering. In some cases, other methods for clustering data in combination with computed auxiliary features may be used by the status engine 400 as appropriate.

Turning to FIG. 4B, the models may be used to identify particular statuses such that when signals 430 (e.g., user actions and context information) are provided to the status engine 400, one or more models 420 can be used to determine the status 440 for the user (such as also described with respect to FIG. 3).

In some cases, k-means clustering can be used to determine status by grouping similar sessions and discovering underlying patterns. For example, each session in the sets of data 410 can be clustered based on feature similarity. A cluster refers to a collection of data points aggregated together because of certain similarities. Each cluster may be labeled with a status and can be assigned certain reading and authoring tools. Then, during a user session having status-based reading and authoring assistance, when new signals are received for a session, the signals can be assigned to the correct cluster having a corresponding status and assigned reading and authoring tools.

In an illustrative example, a cluster having similar features or characteristics such as, but not limited to, very short sessions, file types including .PDF, .DOC, and .ODT, printing and opening in client commands, less than average file size, very few total read actions, "open file" commands with no "new file" commands, no interacting with comments, no saving commands, and no writing actions, may be labeled with an offline reading sub status. The offline reading sub status may be assigned, for example, a time to read tool.

In another example, a cluster having similar features or characteristics such as, but not limited to, very large files, very short sessions, find commands, no printing, and no interacting with comments, may be labeled with a scanning sub status. The scanning sub status may be assigned, for example, a search tool and a key points tool.

In yet another example, a cluster having similar features or characteristics such as, but not limited to, longer than average session length, many write actions and low read actions, such as many image and formatting, dictation, typing, tables and pasting commands, saving file edits and copies, and "new file" commands with no "open file" commands, may be labeled with a deep writing sub status. In some cases, the deep writing sub status may be assigned, for example, a dictionary tool, a thesaurus tool, a grammar and spelling tool, and a writing refinement tool. In some cases, the deep writing sub status may not be assigned any reading and authoring tools as a user with a deep writing sub status may not want to be bothered.

Figure 5A:
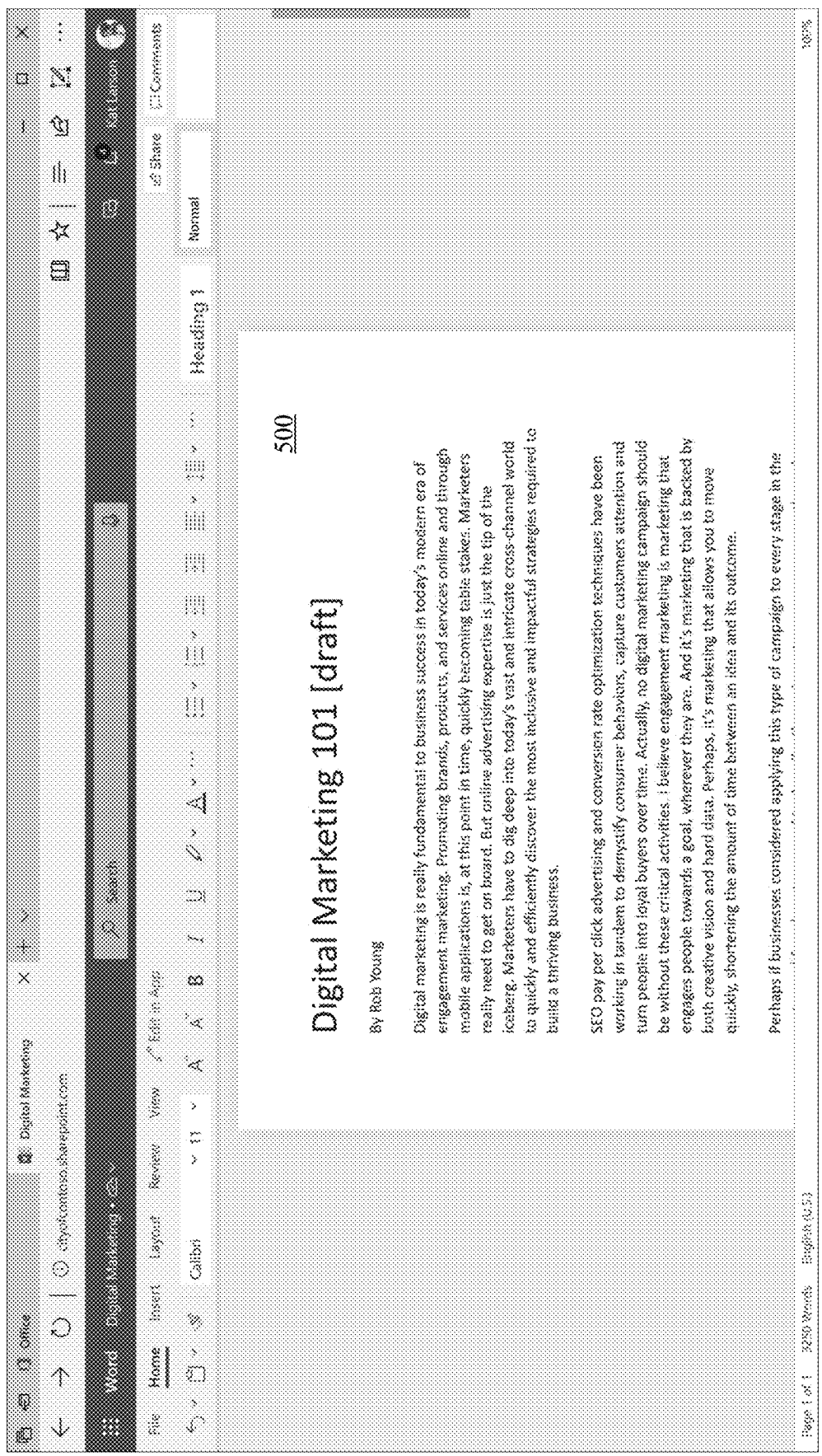
FIGS. 5A-5C illustrate an example scenario for an application with a status-based reading and authoring assistance feature according to an example embodiment of the invention.
Figure 5B:
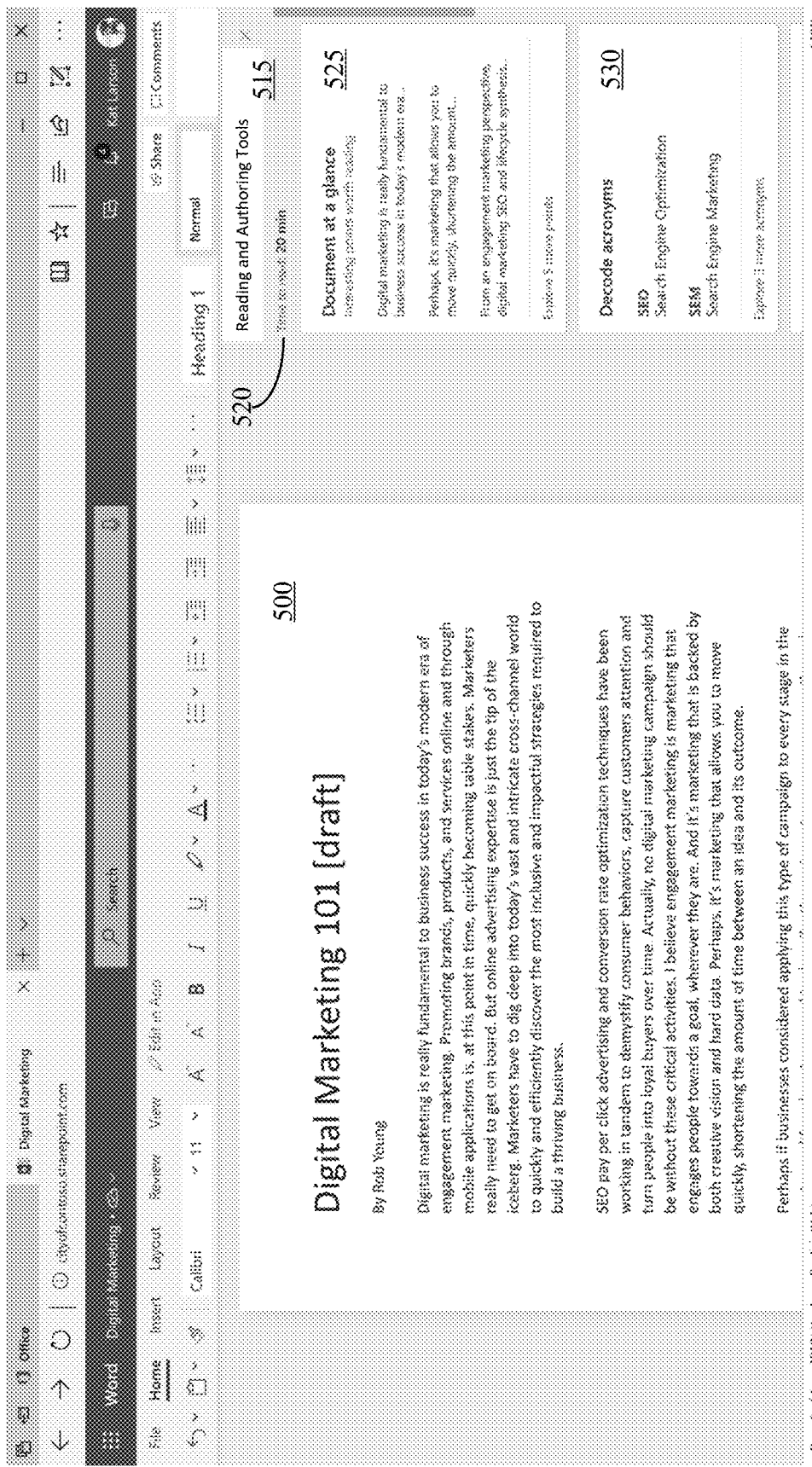
Figure 5C:
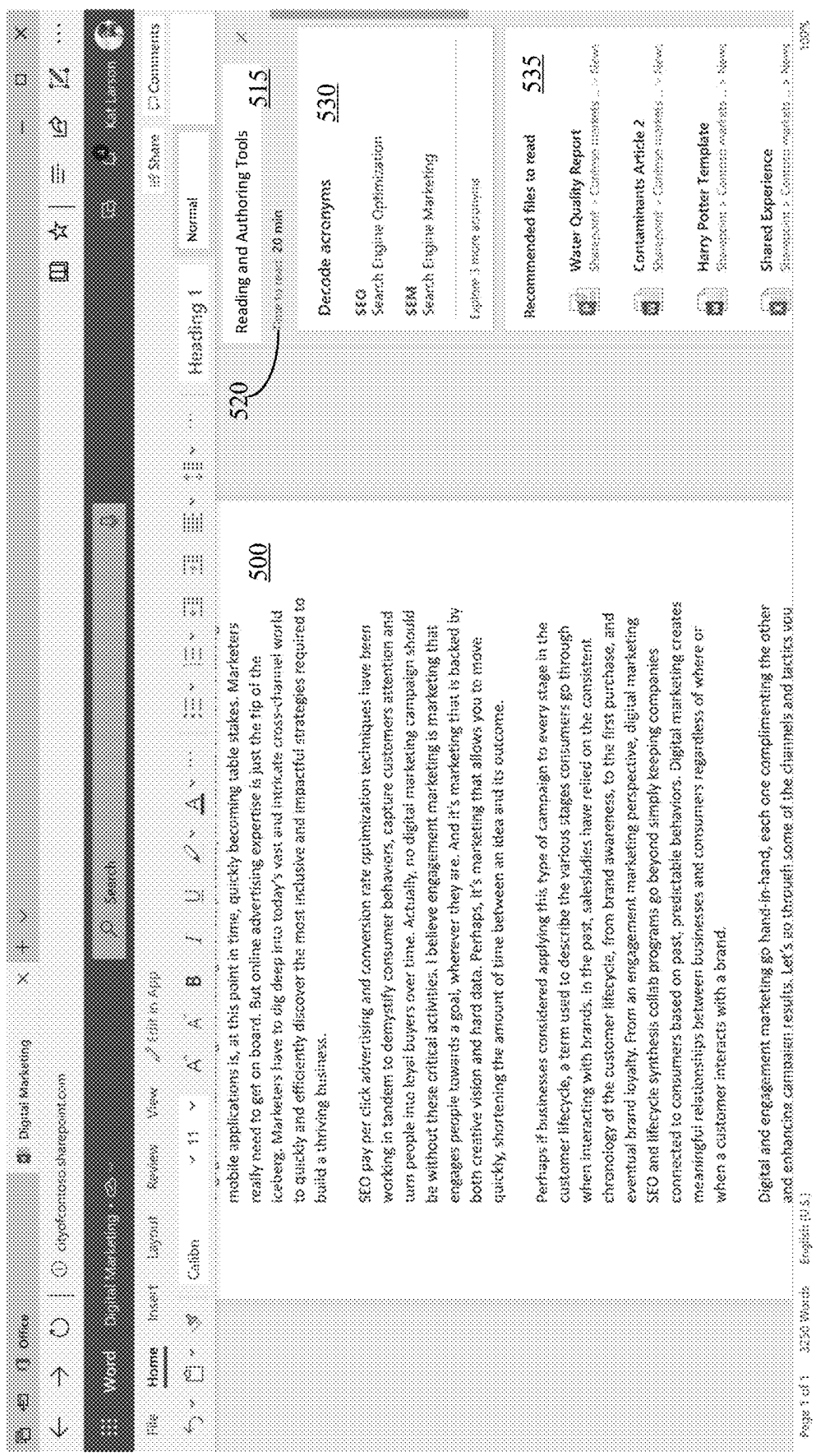

FIGS. 5A-5C illustrate an example scenario for an application with status-based reading and authoring assistance according to an example embodiment of the invention. Referring to FIG. 5A, a user may be working on a file 500 within an application that has a status-based reading and authoring assistance feature. The status-based reading and authoring assistance feature may be part of a background process or 'always running' type of process such that reading and authoring tools are provided to the user without a direct request.

A status determination may be made upon the user opening the file 500 and beginning a current session. The status may be determined by analyzing signals associated with the file, such as user actions and context information.

In the illustrated example, the status is determined to be a reading status. The signals indicating a reading status can include, for example, the file 500 has been authored by a different person, the user has not previously authored the file 500, or the user only has read only access permissions to the file 500. Additional signals indicating a reading status can include, for example, the user has never saved the file 500 or the user is scrolling through or printing the file 500.

Referring to FIGS. 5B and 5C, a reading and authoring tools pane ("tools pane") 515 may be displayed. The tools pane 515 may include reading and authoring tools adapted based on the determined status of the user, which in this case is a reading status. In the illustrated example, the reading and authoring tools that correlate with a reading status include a time to read tool 520, a key points tool 525, an acronyms tool 530, and a recommended files tool 535.

Figure 6A:
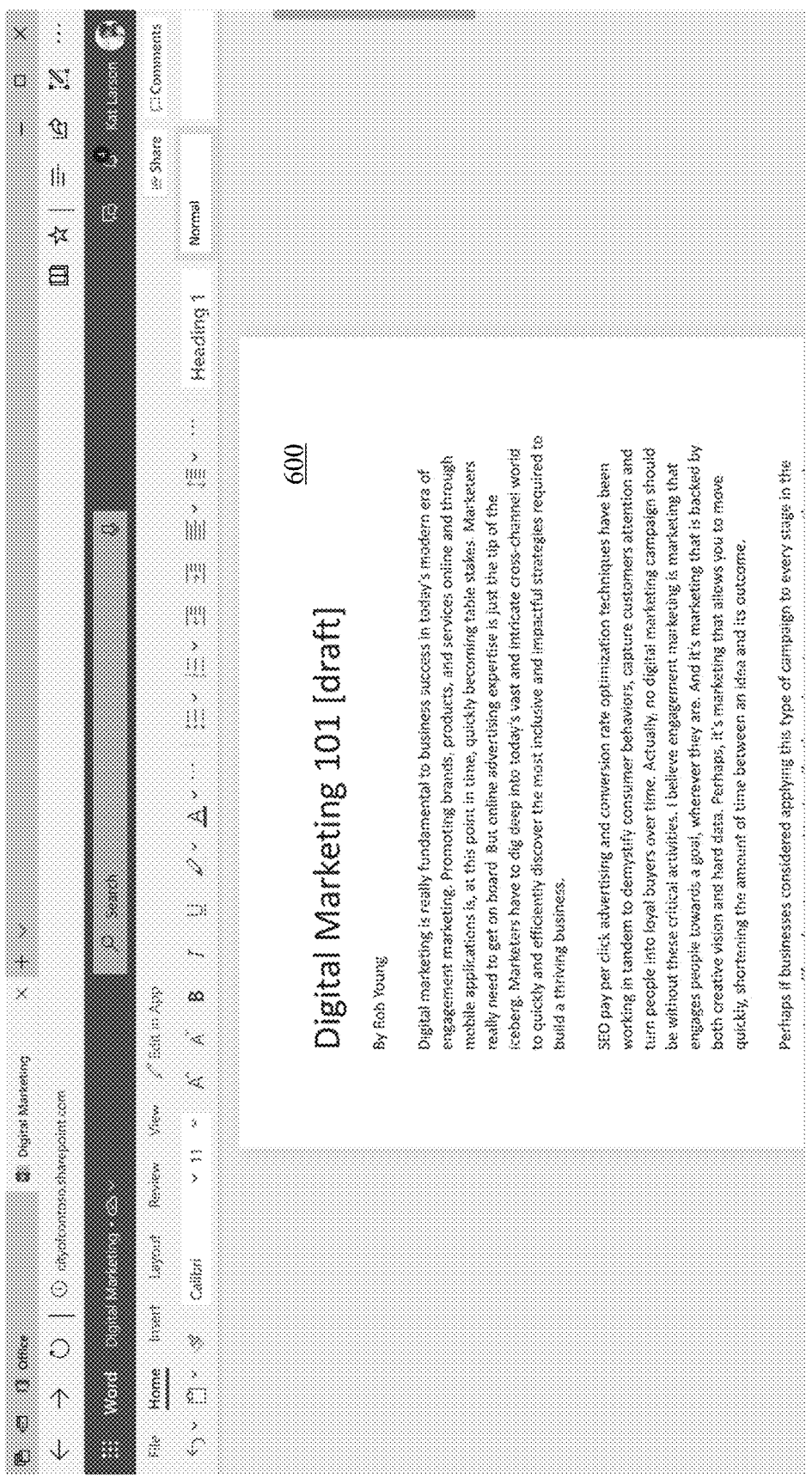
Figure 6B:
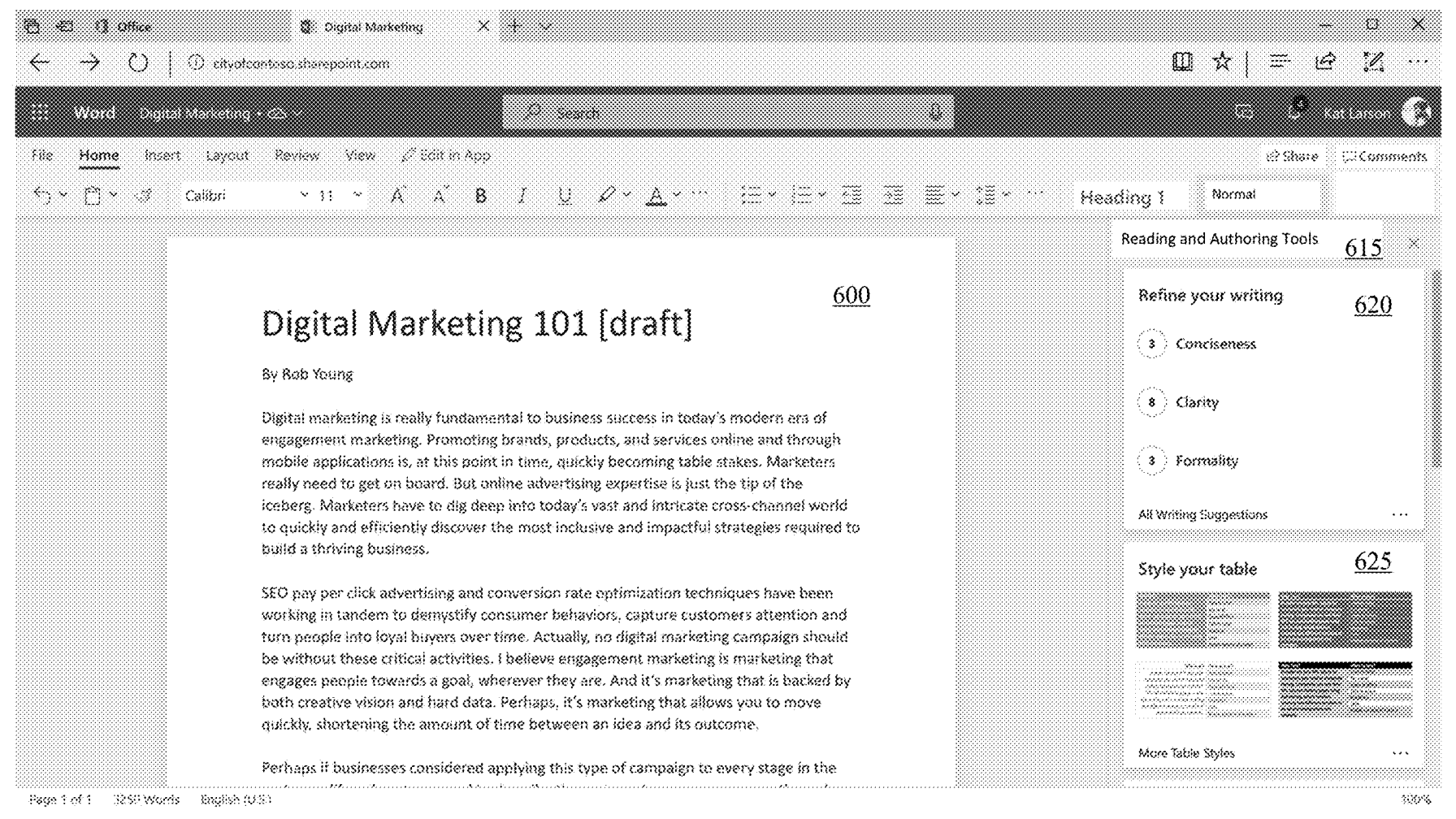
Figure 6C:
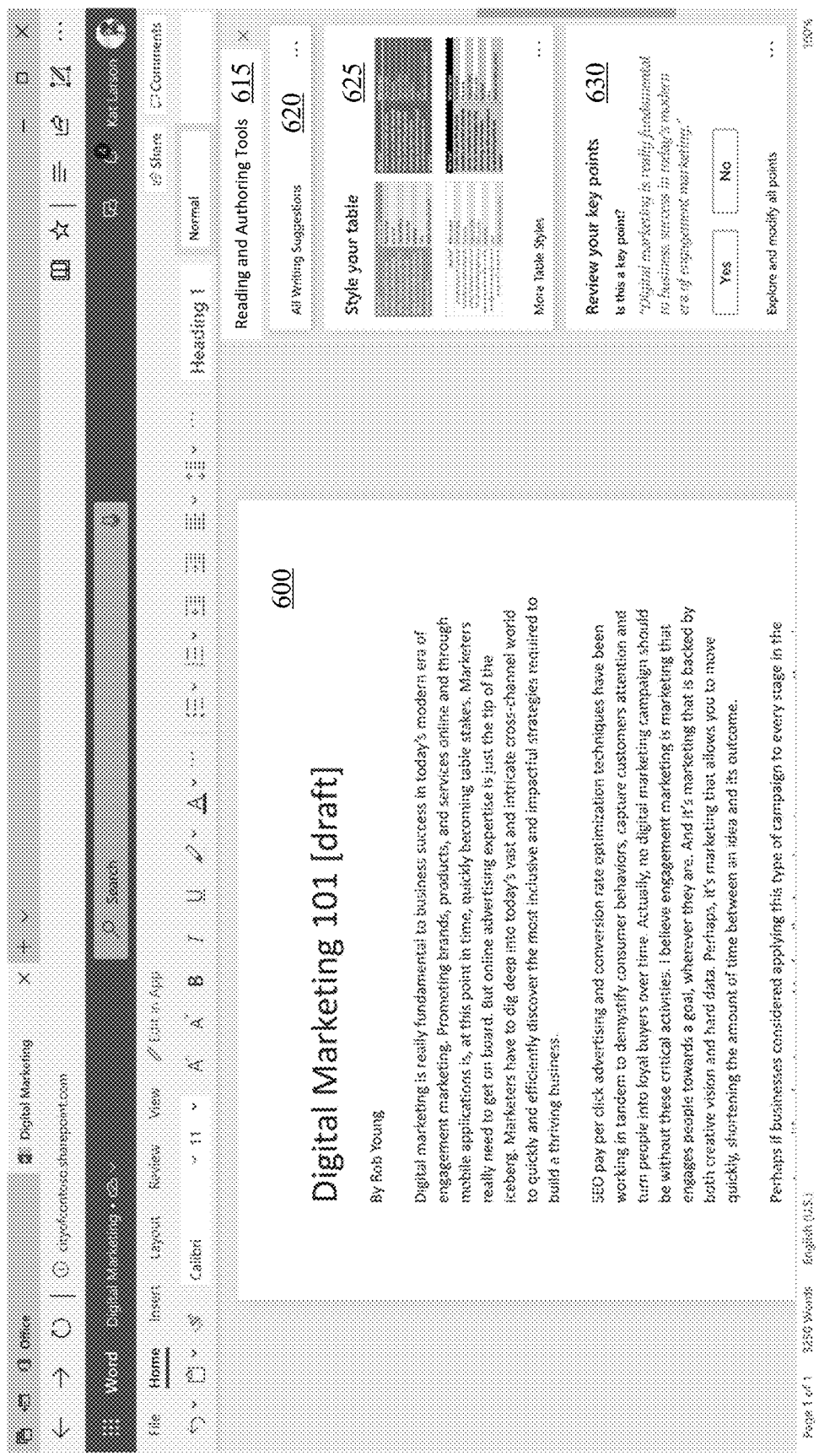

FIGS. 6A-6C illustrate an example scenario for an application with status-based reading and authoring assistance according to an example embodiment of the invention. Referring to FIG. 6A, a user may be working on a file 600 within an application that has a status-based reading and authoring assistance feature. The status-based reading and authoring assistance feature may be part of a background process or 'always running' type of process such that reading and authoring tools are provided to the user without a direct request.

A status determination may be made upon the user opening the file 600 and beginning a current session. The status may be determined by analyzing signals associated with the file, such as user actions and context information.

In the illustrated example, the status is determined to be an authoring status. The signals indicating an authoring status can include, for example, that the file 600 is a new file, the user is the owner of the file 600 or has previously saved or edited the file 600 or the user has read and write access permissions to the file 600. Additional signals indicating an authoring status can include, for example, the user is typing or executing copy and paste commands within the file 600.

Referring to FIGS. 6B and 6C, a reading and authoring tools pane ("tools pane") 615 may be displayed. The tools pane 615 may include reading and authoring tools adapted based on the determined of the user, which in this case is an authoring status. In the illustrated example, the reading and authoring tools that correlate with an authoring status include a writing refinement tool 620, a style tool 625, and a key points tool 630.

Figure 7A:
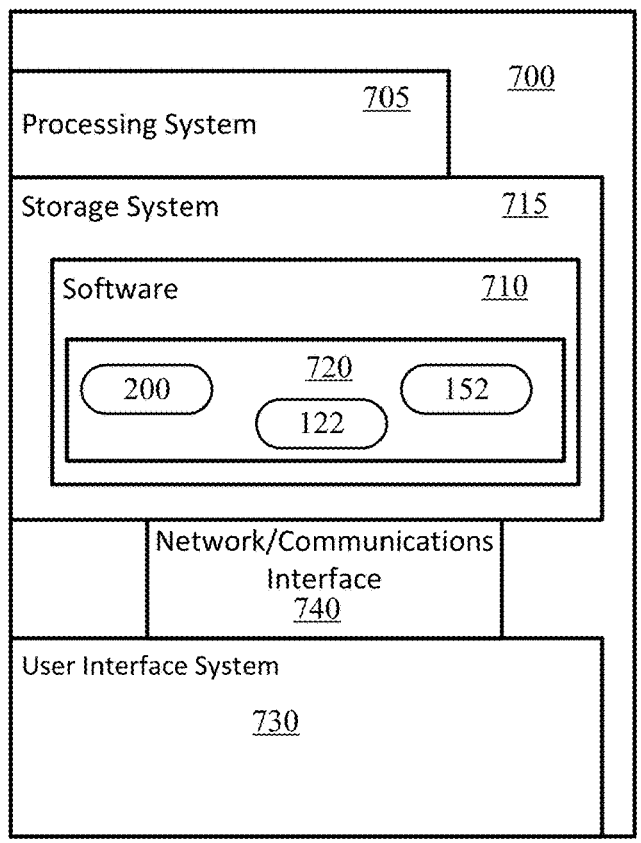
FIGS. 7A and 7B illustrate components of example computing systems that may carry out the described processes.
Figure 7B:
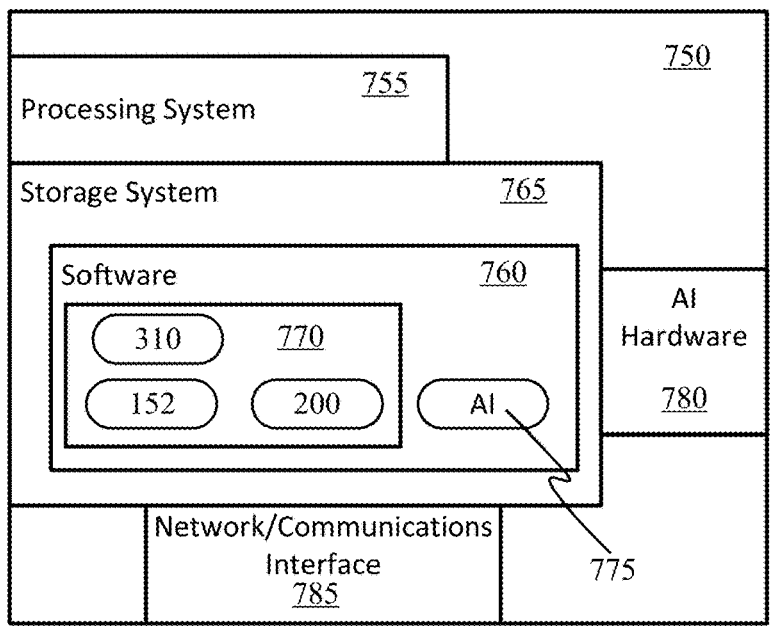

FIGS. 7A and 7B illustrate components of example computing systems that may carry out the described processes. Referring to FIG. 7A, system 700 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, a smart television, or an electronic whiteboard or large form-factor touchscreen. Accordingly, more or fewer elements described with respect to system 700 may be incorporated to implement a particular computing device. Referring to FIG. 7B, system 750 may be implemented within a single computing device or distributed across multiple computing devices or sub-systems that cooperate in executing program instructions. Accordingly, more or fewer elements described with respect to system 750 may be incorporated to implement a particular system. The system 750 can include one or more blade server devices, standalone server devices, personal computers, routers, hubs, switches, bridges, firewall devices, intrusion detection devices, mainframe computers, network-attached storage devices, and other types of computing devices.

In embodiments where the system 750 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

Systems 700 and 750 can include processing systems 705, 755 of one or more processors to transform or manipulate data according to the instructions of software 710, 760 stored on a storage system 715, 765. Examples of processors of the processing systems 705, 755 include general purpose central processing units (CPUs), graphics processing units (GPUs), field programmable gate arrays (FPGAs), application specific processors, and logic devices, as well as any other type of processing device, combinations, or variations thereof.

The software 710 can include an operating system and application programs 720, including application 122 and/or services 152, as described with respect to FIGS. 1A and 1B (and in some cases aspects of service(s) 310 such as described with respect to FIG. 3). In some cases, application 720 can perform some or all of process 200 as described with respect to FIG. 2.

Software 760 can include an operating system and application programs 770, including services 152 as described with respect to FIG. 1B and services 310 such as described with respect to FIG. 3; and application 770 may perform some or all of process 200 as described with respect to FIG. 2. In some cases, software 760 includes instructions 775 supporting artificial intelligence or other implementation of a status engine such as described with respect to FIGS. 3, 4A, and 4B. In some cases, system 750 can include or communicate with artificial intelligence hardware 780 to instantiate a status engine.

In some cases, models (e.g., models 140, 160, 420) may be stored in storage system 715, 765.

Storage systems 715, 765 may comprise any suitable computer readable storage media. Storage systems 715, 765 may include volatile and nonvolatile memories, removable and non-removable media implemented in any method or technology for storage of information, such as computer readable instructions, data structures, program modules, or other data. Examples of storage media of storage systems 715, 765 include random access memory, read only memory, magnetic disks, optical disks, CDs, DVDs, flash memory, magnetic cassettes, magnetic tape, magnetic disk storage or other magnetic storage devices, or any other suitable storage media. In no case do storage media consist of transitory, propagating signals.

Storage systems 715, 765 may be implemented as a single storage device but may also be implemented across multiple storage devices or sub-systems co-located or distributed relative to each other. Storage systems 715, 765 may include additional elements, such as a controller, capable of communicating with processing systems 705, 755.

System 700 can further include user interface system 730, which may include input/output (I/O) devices and components that enable communication between a user and the system 700. User interface system 730 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 730 may also include output devices such as display screen(s), speakers, haptic devices for tactile feedback, and other types of output devices. In certain cases, the input and output devices may be combined in a single device, such as a touchscreen display which both depicts images and receives touch gesture input from the user.

A natural user interface (NUI) may be included as part of the user interface system 730 for a user (e.g., user 100 of FIGS. 1A and 1B) to input selections, commands, and other requests, as well as to input content. Examples of NUI methods include those relying on speech recognition, touch and stylus recognition, gesture recognition both on screen and adjacent to the screen, air gestures, head and eye tracking, voice and speech, vision, touch, hover, gestures, and machine intelligence. Accordingly, the systems described herein may include touch sensitive displays, voice and speech recognition, intention and goal understanding, motion gesture detection using depth cameras (such as stereoscopic or time-of-flight camera systems, infrared camera systems, red-green-blue (RGB) camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

Visual output may be depicted on a display in myriad ways, presenting graphical user interface elements, text, images, video, notifications, virtual buttons, virtual keyboards, or any other type of information capable of being depicted in visual form.

The user interface system 730 may also include user interface software and associated software (e.g., for graphics chips and input devices) executed by the OS in support of the various user input and output devices. The associated software assists the OS in communicating user interface hardware events to application programs using defined mechanisms. The user interface system 730 including user interface software may support a graphical user interface, a natural user interface, or any other type of user interface.

Network interfaces 740, 785 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Certain embodiments may be implemented as a computer process, a computing system, or as an article of manufacture, such as a computer program product or computer-readable storage medium. Certain methods and processes described herein can be embodied as software, code and/or data, which may be stored on one or more storage media. Certain embodiments of the invention contemplate the use of a machine in the form of a computer system within which a set of instructions, when executed by hardware of the computer system (e.g., a processor or processing system), can cause the system to perform any one or more of the methodologies discussed above. Certain computer program products may be one or more computer-readable storage media readable by a computer system (and executable by a processing system) and encoding a computer program of instructions for executing a computer process. It should be understood that as used herein, in no case do the terms "storage media", "computer-readable storage media" or "computer-readable storage medium" consist of transitory carrier waves or propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method for status-based reading and authoring assistance comprising:
   during an active user session of an application:
   automatically detecting a current-use status of a file displayed in a user interface of the application based on use of the file by a user, wherein automatically detecting the current-use status of the file comprises:
     receiving signals associated with a file displayed in a user interface of the application, wherein the received signals comprise one or more user actions and context information, the one or more user actions comprising at least a command from a default toolbar displayed in the user interface of the application, the context information comprising at least one of a user name, an application name, application permissions, a file name, a file type, file lifecycle information, content in the file, and a client type; and
     determining a first status of the current-use status using at least the received signals, wherein the first status is selected from current-use status sub options, the current-use status sub options including a plurality of reading sub statuses and a plurality of authoring sub statuses, wherein each current-use status sub option has a corresponding at least one tool of the application associated therewith;
   adapting reading or authoring tools displayed in the user interface of the application for the file according to the first status, including displaying the corresponding at least one tool associated with the first status;
   automatically updating the current-use status of the file displayed in the user interface of the application based on further use of the file by the user, wherein automatically updating the current-use status of the file comprises:
     receiving new signals associated with the file, wherein the new signals associated with the file comprise at least one new user action or a new context information; and
     determining a second status of the current-use status using the new signals associated with the file, wherein the second status is selected from the current-use status sub options and is a different current-use status sub option than the first status; and
   adapting the reading or authoring tools displayed in the user interface of the application for the file according to the second status such that there is a change in at least one of the reading or authoring tools displayed in the user interface.

2. The method of claim 1, wherein determining the first status of the current-use status comprises analyzing the received signals using a status engine.

3. The method of claim 2, wherein the status engine comprises one or more models.

4. The method of claim 1, wherein adapting the reading or authoring tools displayed in the user interface of the application for the file according to the first status comprises:
  determining a first set of reading and authoring tools that corresponds to the first status; and
  providing the first set of the reading and authoring tools for display in the user interface of the application.

5. The method of claim 4, wherein adapting the reading or authoring tools displayed in the user interface of the application for the file according to the second status comprises:
  determining a second set of the reading and authoring tools that corresponds to the second status; and
  providing the second set of the reading and authoring tools for display in the user interface of the application in place of the first set of the reading and authoring tools.

6. The method of claim 1, wherein the first status is a particular reading sub status of the plurality of reading sub statuses and the adapting reading or authoring tools displayed in the user interface of the application based on the first status comprises providing at least a read aloud tool and a time to read tool.

7. The method of claim 1, wherein the first status is a particular authoring sub status of the plurality of authoring sub statuses and the adapting reading or authoring tools displayed in the user interface of the application based on the first status comprises providing at least a writing refinement tool and a rewrite tool.

8. The method of claim 1, wherein the plurality of reading sub statuses comprises at least one of a skimming sub status, a scanning sub status, a deep reading sub status, and an offline reading sub status.

9. The method of claim 1, wherein the plurality of authoring sub statuses comprises at least one of a deep writing sub status, a shallow writing sub status, an editing sub status, and a reviewing sub status.

10. A computer readable storage medium having instructions stored thereon that, when executed by a processing system, perform a method comprising:
  during an active user session of an application:
    automatically detecting a current-use status of a file displayed in a user interface of the application based on use of the file by a user, wherein automatically detecting the current-use status of the file comprises:
      receiving signals associated with a file displayed in a user interface of the application, wherein the received signals comprise one or more user actions and context information, the context information comprising at least one of a user name, user history information, an application name, application permissions, a file name, a file type, file lifecycle information, content in the file, and a client type; and
      determining a first status of the current-use status using at least the received signals, wherein the first status is selected from current-use status sub options, the current-use status sub options including a plurality of reading sub statuses and a plurality of authoring sub statuses, wherein each current-use status sub option has a corresponding at least one tool of the application associated therewith;
    adapting reading or authoring tools displayed in the user interface of the application for the file according to the first status, including displaying the corresponding at least one tool associated with the first status;
    automatically updating the current-use status of the file displayed in the user interface of the application based on further use of the file by the user, wherein automatically updating the current-use status of the file comprises:
      receiving new signals associated with the file, wherein the new signals associated with the file comprise at least one new user action or a new context information; and
      determining a second status of the current-use status using the new signals associated with the file, wherein the second status is selected from the current-use status sub options and is a different current-use status sub option than the first status; and
    adapting the reading or authoring tools displayed in the user interface of the application according to the second status such that there is a change in at least one of the reading or authoring tools displayed in the user interface.

11. The medium of claim 10, wherein adapting the reading or authoring tools displayed in the user interface of the application for the file according to the first status comprises:
  determining a first set of reading and authoring tools that corresponds to the first status; and
  providing the first set of the reading and authoring tools for display in the user interface of the application.

12. The medium of claim 11, wherein adapting the reading or authoring tools displayed in the user interface of the application for the file according to the second status comprises:
  determining a second set of the reading and authoring tools that corresponds to the second status; and
  providing the second set of the reading and authoring tools for display in the user interface of the application in place of the first set of the reading and authoring tools.

13. The medium of claim 10, wherein the plurality of reading sub statuses comprises at least one of a skimming sub status, a scanning sub status, a deep reading sub status, and an offline reading sub status.

14. The medium of claim 10, wherein the plurality of authoring sub statuses comprises at least one of a deep writing sub status, a shallow writing sub status, an editing sub status, and a reviewing sub status.

15. The medium of claim 10, wherein determining the first status of the current-use status comprises analyzing the received signals using a machine learning status engine comprising one or more machine learning models; and wherein determining the second status of the current-use status comprises analyzing the new signals using the machine learning status engine comprising the one or more machine learning models.

16. A system comprising:
  a processing system;
  a storage system; and
  instructions stored on the storage system that, when executed by the processing system, direct the processing system to:
    during an active user session of an application:
      automatically detect a current-use status of a file displayed in a user interface of the application based on use of the file by a user, wherein instructions to automatically detect the current-use status of the file direct the processing system to at least:
        receive signals associated with a file displayed in a user interface of the application, wherein the received signals comprise one or more user actions and context information, the one or more user actions comprising at least a command from a default menu displayed in the user interface of the application, the context information comprising at least one of a user name, an application name, application permissions, a file name, a file type, file lifecycle information, content in the file, and a client type; and determine a first status of the current-use status using at least the received signals, wherein the first status is selected from current-use status sub options, the current-use status sub options including a plurality of reading sub statuses and a plurality of authoring sub statuses, wherein each current-use status sub option has a corresponding at least one tool of the application associated therewith;

adapt reading or authoring tools displayed in the user interface of the application for the file according to the first status, including displaying the corresponding at least one tool associated with the first status;

automatically update the current-use status of the file displayed in the user interface of the application based on further use of the file by the user, wherein instructions to automatically update the current-use status of the file direct the processing system to at least:

receive new signals associated with the file, wherein the new signals associated with the file comprise at least one new user action or a new context information; and determine a second status of the current-use status using the new signals associated with the file, wherein the second status is selected from the current-use status sub options and is a different current-use status sub option than the first status; and adapt the reading or authoring tools displayed in the user interface of the application for the file according to the second status such that there is a change in at least one of the reading or authoring tools displayed in the user interface.

17. The system of claim 16, wherein the instructions to determine the first status of the current-use status direct the processing system to:

analyze the received signals using a status engine, wherein the status engine comprises one or more models.

18. The system of claim 16, wherein the instructions to adapt the reading or authoring tools displayed in the user interface of the application for the file according to the first status direct the processing system to:

determine a first set of reading and authoring tools that corresponds to the first status; and provide the first set of the reading and authoring tools for the display in the user interface of the application.

19. The system of claim 16, wherein the first status is a particular reading sub status of a plurality of reading sub statuses and the second status is a particular authoring sub status of a plurality of authoring sub statuses.

* * * * *